May 5, 1942.  H. N. FAIRBANKS  2,282,044
INDICATING MEANS AND MAGAZINE EJECTOR FOR FILM HANDLING APPARATUS
Filed April 29, 1939
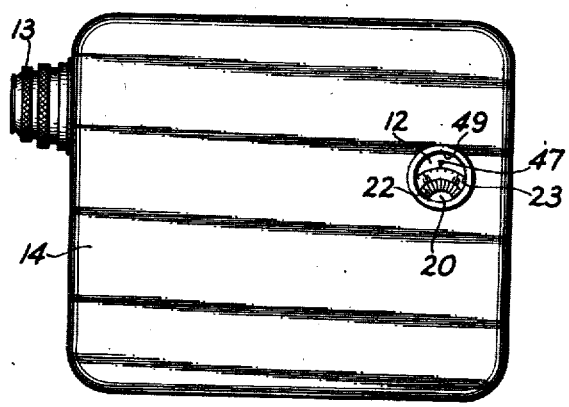
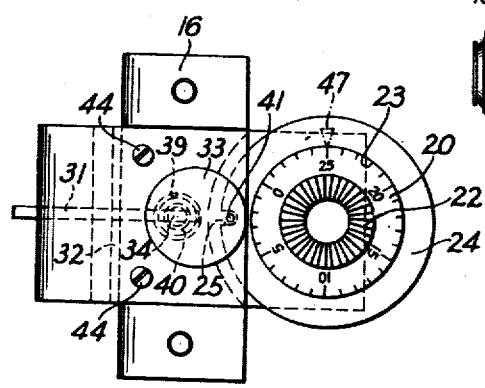
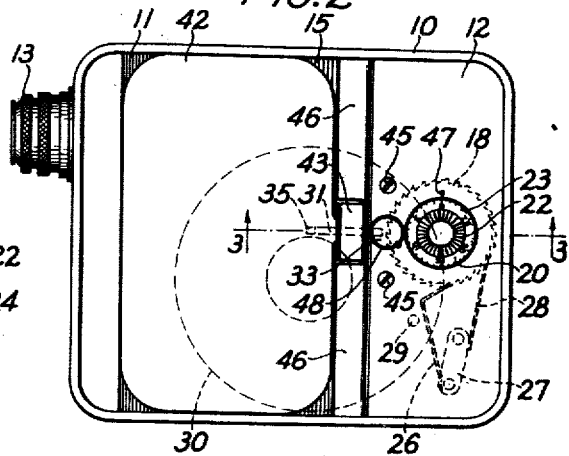
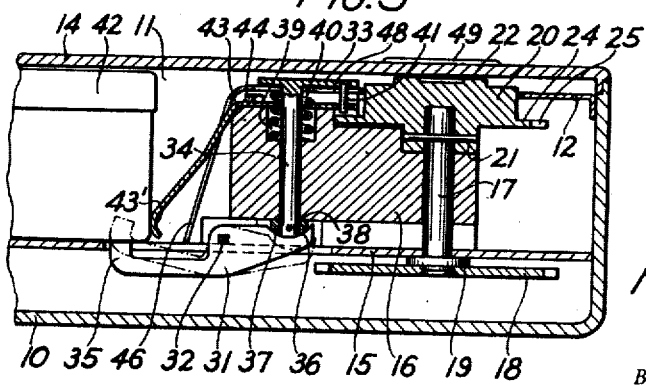
HENRY N. FAIRBANKS
INVENTOR
BY
ATTORNEYS Patented May 5, 1942

2,282,044

UNITED STATES PATENT OFFICE 2,282,044

INDICATING MEANS AND MAGAZINE EJECTOR FOR FILM HANDLING APPARATUS

Henry N. Fairbanks, Rochester, N. Y., assignor to Eastman Kodak Company, Rochester, N. Y., a corporation of New Jersey Application April 29, 1939, Serial No. 270,828

11 Claims. (Cl. 95—31)

The present invention relates to an indicating means and magazine ejector for film handling apparatus of the magazine type and more particularly to a combination of the indicating means and ejector arranged so that a film magazine may be displaced with respect to its magazine chamber only when the indicating means is in a predetermined position.

While many types of indicating means and magazine ejectors are individually well known and while footage indicators have previously been combined with certain parts of a camera, it has never before been proposed to combine an indicating means and a magazine ejector so that the ejector may be operated only in a preselected position of the indicating means.

The primary object of the present invention is the provision of a combination including a magazine ejector and an indicating means which are relatively arranged so that the ejector is operative only when the indicating means is in a predetermined position.

A further object of the invention is the combination of an indicating means, magazine ejector, and co-operating parts thereon so that the magazine ejector is inoperative until a graduated member of the indicating means has been moved to a preselected position.

Another object of the invention is the provision in the casing for a magazine type of film handling apparatus of a panel on which the indicating means and finger member of the ejecting means are located, said indicating and ejecting means being arranged so that the ejecting means can be operated only when the indicating means is in a predetermined position, and the cover for said casing enclosing said panel.

Other and further objects of the invention will be suggested to those skilled in the art by the description which follows.

The above and other objects of the invention are embodied in a film handling apparatus of the magazine type and comprising in combination a casing providing a magazine chamber and having a panel adjacent thereto, an indicating means on said panel and movable to various positions for indicating an operating condition of the apparatus, an ejecting means for displacing a film magazine with respect to said chamber, including a finger member available at said panel and arranged with respect to said indicating means to be operative only when said indicating means is in a predetermined position, and a cover for said casing, for enclosing said magazine chamber, and for covering said panel to render inaccessible the finger member of said ejecting means but provided with an opening through which said indicating means may be observed.

Reference is hereby made to the accompanying drawing wherein similar reference characters designate similar elements and wherein:

Fig. 1 is a side elevation of a magazine camera having an indicating means in accordance with the invention.

Fig. 2 is also a side elevation of a magazine camera with the cover removed to illustrate the graduated member of the indicating means and the finger member of the ejecting means.

Fig. 3 is a fragmentary transverse cross section of the indicating and ejecting means to enlarged scale and taken on the line 3—3 of Fig. 2.

Fig. 4 is a detail plan view of the support for the indicating and ejecting means.

While the present disclosure of the invention is related to a magazine camera and to the footage indicator thereof, it is to be understood that the ejecting means may be combined with any type of indicating means which designates an operating condition of the apparatus and such combination may be advantageously employed on any film handling apparatus of the magazine type.

In the illustrated embodiment of the invention, the film handling apparatus comprises a casing 10 providing a magazine chamber 11 and having a panel 12. An objective assembly 13 is appropriately attached to casing 10, such as on the front wall thereof. A cover 14 may be removed from the casing 10 for access to the interior of the camera, see Fig. 2, and in closed position is fastened to the casing 10 by any conventional means, such as locks or a hinge and latch, not shown.

A mechanism plate 15 extends longitudinally of the casing 10 and forms one wall of the magazine chamber 11. A supporting block 16 is mounted upon mechanism plate 15 and carries the indicating means and ejecting means of the invention.

The indicating means may indicate any operating condition of the apparatus, such as film footage, tension in the spring motor, film advancing speed, etc., but has been shown herein for purposes of illustration as a footage indicator. Such a footage indicator may be of conventional form as shown and may comprise a spindle 17 rotatably mounted in supporting block 16, a ratchet wheel 18 on one end of spindle 17 and spaced from mechanism plate 15 by a washer 19, and a graduated member 20 which is fastened to the other end of spindle 17 by a pin 21. Said graduated member 20 carries an annular ring of serrations 22 and a circle of footage graduations 23 accompanied by appropriate numerals. As shown in Figs. 2 and 4, these numerals range from "0" to "25." The graduated member 20 also carries a peripheral rim 24 which is provided with a notch 25.

The indicating means may be advanced as indicated by the dotted lines in Fig. 2 or may be directly geared to the operating mechanism of the apparatus. For purposes of illustration, advancement of the indicating means may be accomplished by an advancing pawl 26 mounted at one end on a bracket 27 which also carries a holding pawl 28. Said pawls 26 and 28 are in engagement with the teeth of ratchet wheel 19 and pawl 26 is intermittently actuated by a pin 29 on spring motor casing 30 for tooth by tooth advancement of ratchet wheel 19 and the graduated member 20, retrograde movement of said ratchet wheel 19 and graduated member being prevented by the holding pawl 28.

The ejecting means may also be constructed in several ways as known in the art. A preferred form of the ejecting means is shown herein and comprises an ejector arm 31, intermediately pivoted to supporting block 16 by a pin 32, and a finger member 33 having a shaft 34 slidable in supporting block 16. Said ejector arm 31 has a projection 35 on one end thereof and movable into the magazine chamber 11 as indicated by the dot-dash lines in Fig. 3, while the other end of ejector arm 31 has an arcuate portion 36 which is engaged by a collar 37 fastened to the lower end of shaft 34 by a pin 38. Supporting block 16 is provided with a recess 39 surrounding the upper end of shaft 34 and in which is located a coil spring 40 which encircles shaft 34 and normally holds the finger member 33 of the ejecting means in non-ejecting position. Said finger member 33 also carries a depending pin 41 which in normal position of said finger member 33 is above and over the peripheral rim 24 of graduated member 20.

The film magazine 42 is held in position within magazine chamber 11 by a spring member 43 which is mounted on block 16 by screws and which has a free end 43' for resiliently engaging a wall of the film magazine 42. The panel 12 is attached to supporting block 16 by a pair of screws 45 and has inclined overhanging portions 46 which assist insertion of the film magazine 42 into the magazine chamber 11. Said panel 12 carries an index mark 47 for registering with the footage graduations 23 on member 20 and said panel 12 is provided with an opening 48 into which the finger member may be moved.

As before mentioned, the casing cover 14 in its closed position renders the ejecting means inaccessible and also covers the indicating means except that a window 49 is provided in cover 14 and is located so that the index mark 47 on panel 12 and a portion of the footage graduations 23 may be observed.

The operation of the combination between the indicating means and ejecting means will now be explained. After insertion of a film magazine 42 into magazine chamber 11 and closure of cover 14, operation of the film handling apparatus or camera will cause advancement of the graduated member of the indicating means with respect to the index mark 47. When a run of film has been completed, the "0" footage graduation will be opposite the index mark 47. Under these conditions and even after opening of cover 14, the ejecting means is still inoperative because the co-operating parts on the graduated member of the indicating means and on the finger member of the ejecting means will not permit sufficient movement of the finger member 33 to eject a film magazine because the notch 25 in peripheral rim 24 is not opposite the depending pin 41 on finger member 43 and said pin 41 will be blocked by rim 24 to prevent ejecting movement of the ejecting means.

However, when the graduated member 20 is moved to re-set the footage indicator and return the "25" graduation to the index mark 47, the notch 25 is opposite the depending pin 41, see Fig. 4, and the finger member 33 may be depressed sufficiently so that the projection 35 on ejector arm 31 moves into the magazine chamber 11 and displaces or ejects the film magazine 42 from said magazine chamber 11. Thus the operator is compelled to re-set the footage indicator before the ejecting operation and must prepare the mechanism for the proper reception of another film magazine before the first film magazine can be ejected. Such compulsory re-setting of the indicating means is particularly useful in connection with a footage indicator on a magazine camera when only part of a film magazine has been used because the operator is reminded to record the film footage which has been run so that no film will be wasted when the magazine is replaced in the camera.

Many other variations of the invention are possible particularly in the arrangement of the co-operating parts, such as the notch 25 in peripheral rim 24 and the depending pin 41, so that the ejector can be operated only when the indicating means is in a predetermined position. The notch and pin shown herein are only illustrative and the scope of the invention is defined by the claims which follow.

Having now particularly described my invention what I desire to secure by Letters Patent of the United States and what I claim is:

1. In a film handling apparatus of the magazine type, the combination with a casing providing a magazine chamber and having a panel adjacent thereto, and an indicating means at said panel and movable to various positions for indicating an operating condition of said apparatus, of an ejecting means for displacing a film magazine with respect to said chamber, including a finger member available at said panel, means operatively arranged between said indicating means and said ejecting means, for preventing operation of said ejecting means and permitting operation thereof only when said indicating means is in a predetermined position, and a cover for said casing, for enclosing said magazine chamber and for covering said panel to render inaccessible the finger member of said ejecting means but provided with an opening through which said indicating means may be observed.

2. In a film handling apparatus of the magazine type, the combination with a casing providing a magazine chamber and having a panel adjacent thereto, an indicating means including a graduated member at said panel and rotatable to indicate an operating condition of said apparatus, and an ejecting means including a finger member movable toward said panel for displacement of a film magazine with respect to said chamber, said graduated member and said finger member having co-operating parts arranged so that said finger member can be operated to eject a film magazine in only one predetermined position of said graduated member, of a cover movable to an open position to permit access to said panel and said magazine chamber and movable to a closed position for enclosing said magazine chamber and for covering said panel to render said graduated member and finger member inaccessible but provided with an opening through which said indicating member may be observed.

3. In a film handling apparatus of the magazine type, the combination with a film operating mechanism for moving a film in said apparatus, and a film footage; indicating means operatively connected to said mechanism and movable to various positions to indicate the length of film moved through said mechanism, of an ejecting means for displacing a film magazine with respect to said apparatus and mechanical means operatively arranged between said indicating means and said ejecting means and for blocking operation of said ejecting means but permitting operation thereof when said indicating means is in a predetermined position.

4. In a film handling apparatus of the magazine type, the combination with an indicating means including a graduated member movable to various positions for indicating an operating condition of said apparatus, of an ejecting means including a finger member and movable for displacement of a film magazine with respect to said chamber, said graduated member and said finger member being relatively arranged so that said finger member can be operated to eject a film magazine in only one predetermined position of said graduated member.

5. In a film handling apparatus of the magazine type, the combination with a film footage; indicating means including a graduated member movable to various positions for indicating the length of film moved by said apparatus, of an ejecting means including a finger member and movable for displacement of a film magazine with respect to said apparatus, and co-operating parts on said graduated member and on said finger member for preventing operation of said finger member for displacement of a film magazine except when said graduated member is in a predetermined position.

6. In a film handling apparatus of the magazine type, the combination with an indicating means including a graduated member movable to various positions for indicating an operating condition of said apparatus, of an ejecting means including a finger member and movable for displacement of a film magazine with respect to said apparatus, and co-operating parts on said graduated member and on said finger member for preventing operation of said finger member for displacement of a film magazine, one of said parts being a projection and the other of said parts being provided with a notch which receives said projection to permit operation of said ejecting means in only one position of said graduated member.

7. In a film handling apparatus of the magazine type, the combination with an indicating means including a graduated member movable to various positions for indicating an operating condition of said apparatus, of an ejecting means including a finger member and movable for displacement of a film magazine with respect to said apparatus, and a pair of co-operating parts, one of which is a peripheral rim on one of said members and the other of which is a projection on the other of said members, for preventing operation of said finger member, said peripheral rim being provided with a notch for receiving said projection to permit operation of said ejecting means in only one position of said graduated member.

8. In a film handling apparatus of the magazine type, the combination with an indicating means including a graduated member movable to various positions for indicating an operating condition of said apparatus, of an ejecting means including a finger member and movable for displacement of a film magazine with respect to said apparatus, a pair of co-operating parts, one on each of said members, and for preventing operation of said finger member to displace a magazine except in one position of said graduated member, and a spring means acting on said finger member to hold it in non-ejecting position and in a position with said co-operating parts out of engagement.

9. In a film handling apparatus of the magazine type, the combination with a casing providing a magazine chamber and having a panel adjacent thereto, an indicating means for indicating an operating condition of said apparatus, and an ejecting means for displacing a film magazine with respect to said chamber, said indicating means and said ejecting means each having an operating member available at said panel, of a casing cover movable to an open position to permit access to said panel and said magazine chamber and movable to closed position for enclosing said magazine chamber and for covering said panel to render said operating members inaccessible.

10. In a film handling apparatus of the magazine type, the combination with a casing providing a magazine chamber and having a panel adjacent thereto, an indicating means for indicating an operating condition of said apparatus, and an ejecting means for displacing a film magazine with respect to said chamber, said indicating means and said ejecting means each having an operating member available at said panel, of a casing cover movable to open position to permit access to said panel and said magazine chamber, movable to a closed position for enclosing said magazine chamber and covering said panel to render said operating members inaccessible, and provided with an opening through which said indicating member may be observed.

11. In a film handling apparatus of the magazine type, the combination with a casing providing a magazine chamber, a support in said casing, and a panel covering said support, of an indicating means including a spindle rotatably mounted in said support and a graduated member on one end of said spindle and having a peripheral rim provided with a notch which is in predetermined angular relation to the graduations on said member, and an ejecting means comprising an arm mounted on said support, having a portion movable into said magazine chamber for displacement of a film magazine therein, a plunger slidable in said support and having one end for engaging and moving said arm, and a finger piece on the other end of said plunger and having a projection adapted to engage the peripheral rim of said graduated member and prevent operation of said plunger but adapted when said graduated member is in a predetermined position to enter said notch during ejecting operation of said plunger and said ejecting means.

HENRY N. FAIRBANKS.